(12) United States Patent
Tock et al.

(10) Patent No.: US 8,185,642 B1
(45) Date of Patent: May 22, 2012

(54) COMMUNICATION POLICY ENFORCEMENT IN A DATA NETWORK

(75) Inventors: Theron Tock, Mountain View, CA (US); Roger A. Chickering, Granite Bay, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1617 days.

(21) Appl. No.: 11/281,905

(22) Filed: Nov. 18, 2005

(51) Int. Cl.
*H04L 9/00* (2006.01)
*H04L 9/32* (2006.01)

(52) U.S. Cl. ............... 709/229; 709/225; 713/170

(58) Field of Classification Search .............. 726/26, 726/1–21
See application file for complete search history.

(56) References Cited

U.S. PATENT DOCUMENTS

| | | | | |
|---|---|---|---|---|
| 6,317,790 B1* | 11/2001 | Bowker et al. | | 709/225 |
| 6,609,154 B1* | 8/2003 | Fuh et al. | | 709/225 |
| 6,734,886 B1* | 5/2004 | Hagan et al. | | 715/853 |
| 6,986,061 B1* | 1/2006 | Kunzinger | | 713/153 |
| 7,072,933 B1* | 7/2006 | Lamb et al. | | 709/203 |
| 7,225,263 B1* | 5/2007 | Clymer et al. | | 709/229 |
| 2002/0129140 A1* | 9/2002 | Peled et al. | | 709/224 |
| 2002/0138623 A1* | 9/2002 | Boden et al. | | 709/227 |
| 2003/0012156 A1* | 1/2003 | Fukuda | | 370/329 |
| 2004/0139319 A1* | 7/2004 | Favazza et al. | | 713/168 |
| 2004/0156374 A1* | 8/2004 | Lee et al. | | 370/401 |
| 2004/0193921 A1* | 9/2004 | Byrne | | 713/201 |
| 2005/0044367 A1* | 2/2005 | Gasparini et al. | | 713/172 |
| 2005/0111466 A1* | 5/2005 | Kappes et al. | | 370/400 |
| 2005/0141527 A1* | 6/2005 | Gateva et al. | | 370/401 |
| 2006/0002388 A1* | 1/2006 | Grebus et al. | | 370/389 |
| 2006/0259583 A1* | 11/2006 | Matsuura | | 709/218 |

OTHER PUBLICATIONS

3GPP TS 29.207 V5.5.1 (Oct. 2003), 3rd Generation Partnership Project; Techincal Sepcification Group—Core Network; Policy Control Over Go Interface (Release 5).*
Postel, J. "Internet Control Message Protocol", DARPA Internet Program Protocol Specification, ISI, Sep. 1981, 21 pages.

* cited by examiner

*Primary Examiner* — Ian N Moore
*Assistant Examiner* — Thai Nguyen
(74) *Attorney, Agent, or Firm* — Harrity & Harrity, LLP

(57) ABSTRACT

A device is configured to receive authorization information from a first network device and to receive a request that data units sent to a destination device contain authorization information, where the request is received from a second network device. The device is configured to assemble authorized data units by associating the authorization information with content intended for a destination device, where the content can be exchanged with the destination device during authorized communication. The device is configured to provide at least one of the authorized data units to the second network device so that the second network device can establish the authorized communication between the device and the destination device.

14 Claims, 4 Drawing Sheets

COMMUNICATION POLICY ENFORCEMENT IN A DATA NETWORK

FIELD OF THE INVENTION

Implementations consistent with the principles of the invention relate generally to network communication and, more particularly, to source authorization and network policy management and/or enforcement in a data communications network.

BACKGROUND

Networks, such as the Internet, have become increasingly important to corporations, government entities, non-profit organizations and private parties. Millions of individuals may access the Internet to conduct business transactions, for educational purposes, to communicate with other users via, for example, email, and for entertainment, such as online gaming. For certain of these transactions it may be desirable that a destination device know the identity or status, such as health, of a source device before accepting information, such as packets, from the source device.

There is a need for techniques that allow a source device to be identified and/or authorized before allowing the source device to send packets to a destination device. These techniques should not require that a destination device, a source device, or another network device operating on behalf of the destination device, know the topology of the network from which the packet was received.

SUMMARY

In accordance with an aspect, a first network device is provided. The first network device may operate on behalf of a destination device to allow authorized communication between the destination device and a source device. The first network device is configured to intercept an unauthorized data unit sent from the source device to the destination device. The first network device is configured to communicate with a second network device that establishes a network policy, where the network policy is used to authorize the source device. The first network device is configured to send a request for authorization information, where the authorization information indicates that the source device is authorized. The first network device is configured to receive data units containing the authorization information from the source device when the source device has received the request, where the authorization information includes first authorizing information received from the second network device. The first network device is configured to forward at least a portion of the data units containing authorization information to the destination device.

In accordance with another aspect, a first network device to determine a network policy is provided. The first network device is configured to authorize a source device according to the network policy so that the source device can operate as an authorized source device and to generate authorization information that can be used by an authorized source device to facilitate authorized communication with a destination device. The first network device is configured to provide the authorization information to the source device and to provide source information to a second network device that allows authorized data units sent from the source device to reach a destination device, where the source information is used by the second network device to determine if the source device is authorized.

In accordance with yet another aspect, a device is provided. The device is configured to receive authorization information from a first network device and to receive a request that data units sent to a destination device contain authorization information, where the request is received from a second network device. The device is configured to assemble authorized data units by associating the authorization information with content intended for a destination device, where the content can be exchanged with the destination device during authorized communication. The device is configured to provide at least one of the authorized data units to the second network device so that the second network device can establish the authorized communication between the device and the destination device.

In accordance with still another aspect, a method for establishing an authorized communication session between a source device and a destination device is provided. The method includes intercepting unauthorized communication intended for the destination device and providing a message to the source device in response to the unauthorized communication, the message informing the source device that authorization information should be included in subsequent communication. The method includes receiving a communication that includes the authorization information and processing the authorization information. The method includes forwarding the communication to the destination device if communication is authorized according to the authorization information and the network policy.

In accordance with still another aspect, a network device is provided. The network device includes means for intercepting a data unit intended for a destination device and means for receiving authorization information from a policy server, where the authorization information is used to determine if communication between a source device and a destination device can be authorized. The network device includes means for sending a request that subsequent communication intended for the destination device contain authorization information to a device associated with the intercepted data unit and means for receiving subsequent data units containing authorization information. The network device includes means for allowing at least a portion of the subsequent data units to reach the destination device if allowed by the network policy as applied to the authorization information and the destination device.

BRIEF DESCRIPTION OF THE DRAWINGS

The accompanying drawings, which are incorporated in and constitute a part of this specification, illustrate implementations of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Exemplary implementations consistent with principles of the invention facilitate enforcement of network policies. For example, network policies may be used to control access to destination devices. Access may include complete access, or denial of access, to a particular destination. Alternatively, access control may allow a source device to access only certain portions of a destination device, such as an account, document, directory, or file. Consistent policy enforcement may require that a source device be uniquely identified and associated with a communication session and/or policy before the source device is allowed to exchange data with a destination device, such as a server.

As used herein, "destination device" may refer to any device capable of receiving and/or sending a data unit. A "source device" may refer to any device capable of participating in communication by transmitting a data unit, capable of being identified in accordance with implementations consistent with the invention as described herein, and/or capable of being associated with an operator that may be identified in accordance with implementations consistent with the invention as described herein. A "data unit" may refer to any type of machine-readable data having substantially any format that may be adapted for use in one or more networks, such as a public network and/or private network. A data unit may include packet data and/or non-packet data.

First Exemplary Implementation

Figure 1:
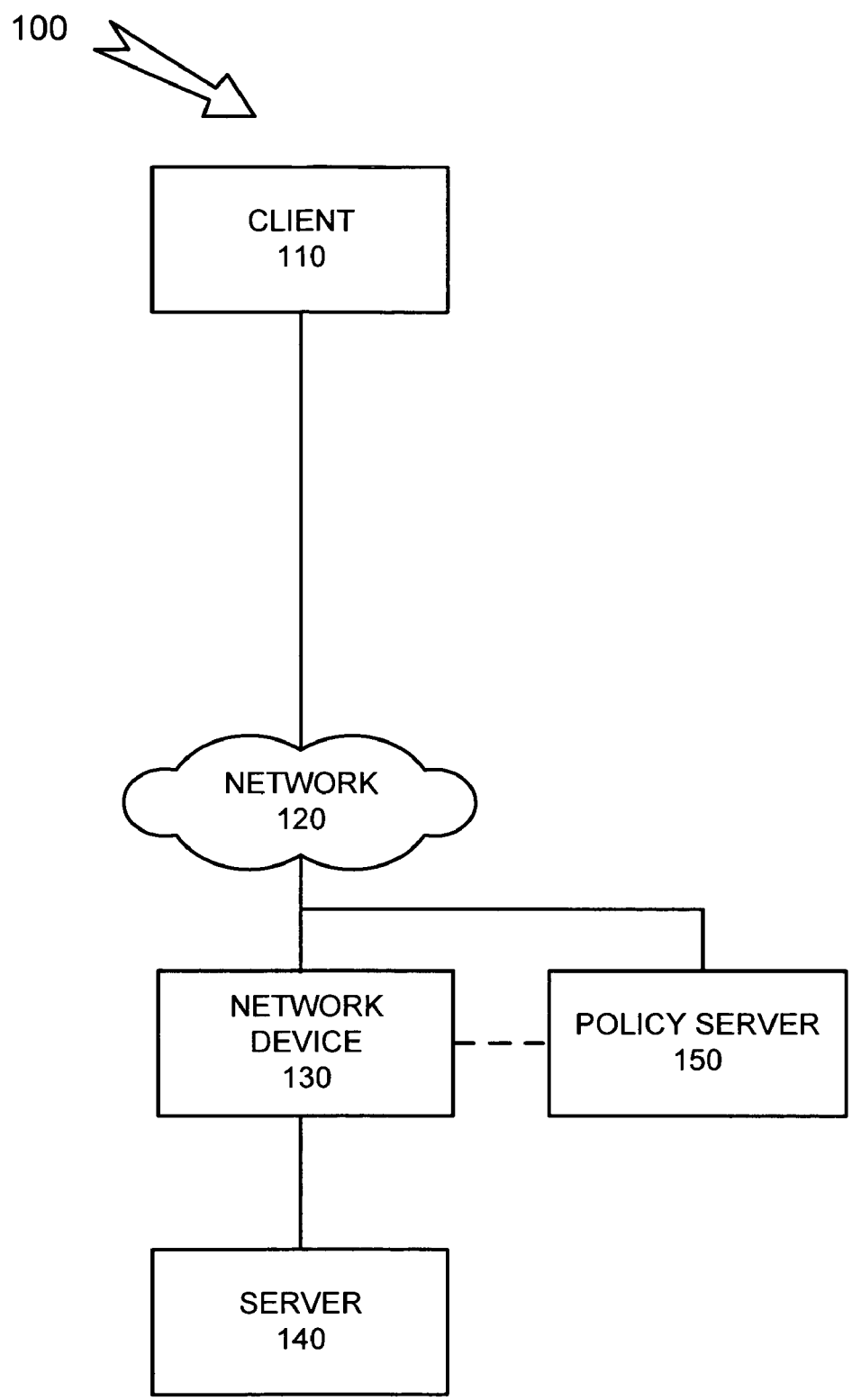
FIG. 1 is a diagram of an exemplary network in which systems and methods consistent with the principles of the invention may be implemented.

FIG. 1 is a diagram of an exemplary network 100 in which systems and methods consistent with the principles of the invention may be implemented. Network 100 may include, among other things, a client 110, a network 120, a network device 130, a server 140 and a policy server 150. While network 100 is shown to include a particular number and arrangement of elements, network 100 may include fewer, more, different, or differently arranged elements in other implementations consistent with the principles of the invention. In addition, network 100 may included the illustrated elements, and other elements, in alternative configurations consistent with the principles of the invention. For example, network device 130 may be located between client 110 and policy server 150.

Client 110 may include a device configured to make a data unit available to a network and/or to receive a data unit from a network. Client 110 may be associated with a person, such as a user. For example, client 110 may include a desktop computer, a laptop computer, a personal digital assistant (PDA), a web enabled cellular telephone, a wireless fidelity (Wi-Fi) device, or an application specific processing device that is operated by a user to communicate with a destination device, such as server 110. Client 110 may operate as a source device and may initiate communication by sending, for example, a data unit, such as a packet, to an intermediate device, such as network device 130, and/or to a destination device, such as server 140. Client 110 may not be allowed to participate in communication with a destination device, such as server 140, unless client 110 is sending authorized data units to the destination device. The authorized data units may pass through an intermediate device, such as network device 130, en route to the destination device and/or may be allowed to pass directly to the destination device without passing through an intermediate device. Authorized data units may be sent by client 110 when a user of client 110 has been identified using one or more devices in network 100, such as network device 130 and/or policy server 150.

Network 120 may include a network, or combination of networks, capable of transporting data units. For example, network 120 may include a local area network (LAN), a metropolitan network (MAN), or a wide area network (WAN), such as the Internet. Network 120 may include hard-wired connections, such as shielded twisted pairs, coaxial cables, optical fibers, and/or waveguides. Alternatively, network 120 may include wireless links, such as free space optical links, and/or free space acoustic links. Network 120 may operate using substantially any protocol, such as asynchronous transfer mode (ATM), synchronous optical transport (Sonet), Internet Protocol (IP), public switched telephone network (PSTN), or Bluetooth.

Network device 130 may include a device capable of receiving a data unit via a network. For example, network device 130 may include an in-line device operating as an edge device between a first network and a destination device that may be operating on a second network. For example, network device 130 may operate as an edge device between an untrusted network, such as the Internet, and a trusted network, such as a corporate LAN. "Inline network device" may refer to any network device operating in a manner whereby all, or substantially all, data units intended for a destination device pass through the network device before reaching the destination device. In one implementation, network device 130 may only forward a data unit to a destination device if the data unit is associated with an authorized source device. Network device 130 may be configured to work with devices, such as policy server 150, for enforcing one or more network policies on behalf of a destination device, such as server 140. Network device 130 may communicate with policy server 150 via network 120 and/or via a direct connection, such as the link shown as a dashed line in FIG. 1. Network device 130 may include devices such as routers, gateways, firewalls, switches, and/or servers.

Server 140 may include a device capable of receiving a data unit from another device or from a network. For example, server 140 may include a workstation, desktop computer, laptop computer, PDA, web enabled cellular telephone, Wi-Fi device, or an application specific processing device. In exemplary implementations described herein, server 140 may operate as a destination device by receiving one or more data units from client 110 via an intermediate device, such as network device 130. For example, server 140 may provide a service to other devices on network 100, such as client 110. Server 140 may be protected from unauthorized packets by other devices on network 100, such as network device 130 and/or policy server 150. Assume that server 140 operates a database containing employee records. Further assume that network device 130, operating in conjunction with policy server 150, may validate the identity of an employee working at a remote location so as to permit the employee access to only those portions of server 140 that the employee is permitted to access in accordance with a network policy administered by policy server 150. For example, the employee may operate client 110 and may only be allowed to communicate with server 140 after the identity of the employee has been validated using network device 130 and/or policy server 150. In the above example, server 140 is protected from unauthorized data units by network device 130 and/or policy server 150. Network device 130 and policy server 150 may determine what types of authorization information are acceptable and/or which types of data units can operate as authorized data units for implementations of the invention.

Policy server 150 may include a device capable of executing machine-readable instructions for implementing and enforcing access control policies associated with network 120 or devices coupled thereto. For example, policy server 150 may be configured using function-executable code, such as software, to communicate with client 110 to establish the identity of client 110. Policy server 150 may communicate with other network devices, such as network device 130 and/or server 140, and may provide information about authorized source devices so that network device 130 and/or server 140 may operate on data units received from the authorized source device, such as client 110.

In one implementation, policy server 150 may authorize client 110 by issuing client 110 a token for use with network device 130 or server 140. The token may be used by client 110 to establish an authorized communication session. In another implementation, policy server 150 may provide client 110 and network device 130 with information that allows client 110 and network device 130 to establish a communication channel, such as an Internet Protocol secure (IPsec) tunnel.

Client 110 may communicate with policy server 150 using connections associated with a primary data network, such as network 120. Alternatively, client 110 may communicate with policy server 150 using a dedicated network and/or link. A link may be a dedicated physical or virtual link and may include encryption protocols for protecting the content of communications between client 110 and policy server 150. Policy server 150 may be coupled to network device 130 using a dedicated link (dashed line in FIG. 1). For example, client 110 may request authorization information, such as a token, from policy server 150 in response to processing a message received from network device 130. Network device 130 may have sent the message to client 110 because network device 130 could not identify the sender of a data unit received at a port of network device 130. Policy server 150 may provide authorization information and/or authorization mechanisms to network device 130 to facilitate communication between client 110 and a destination device.

Exemplary Network Device

Figure 2:
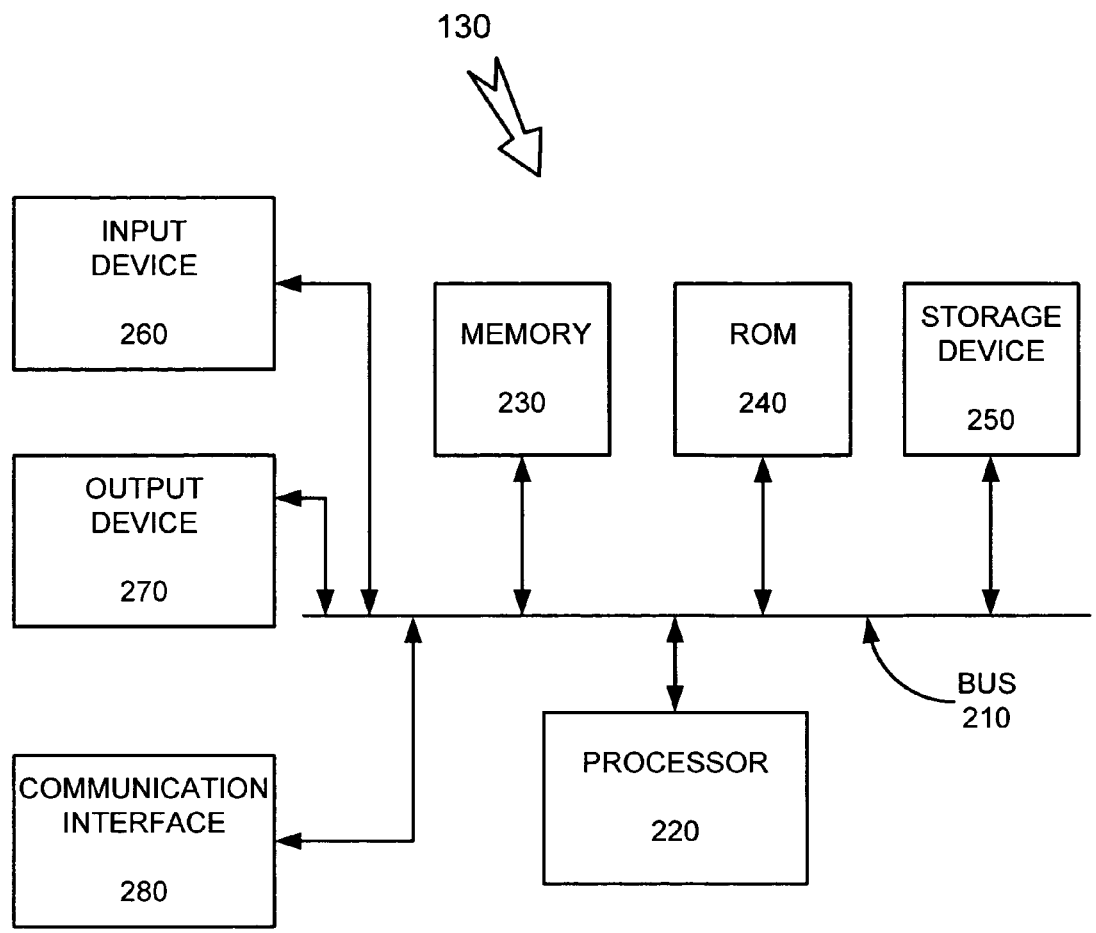
FIG. 2 is an exemplary functional block diagram of a network device for implementing one or more of the devices associated with the network shown in FIG. 1 according to an implementation consistent with the principles of the invention.

FIG. 2 is an exemplary functional block diagram of the network device of FIG. 1 consistent with the principles of the invention. Other devices in system 100, such as client 110, server 140, and/or policy server 150, may be implemented in a similar manner. The implementation illustrated in conjunction with FIG. 2 is exemplary and other configurations may alternatively be used.

Network device 130 may include a bus 210, a processor 220, a memory 230, a read only memory (ROM) 240, a storage device 250, an input device 260, an output device 270, and a communication interface 280. Bus 210 may include optical or electrical conductors for conveying data and instructions among the components of network device 130.

Processor 220 may include any type of processor, microprocessor, and/or processing logic that may interpret and execute instructions. Processor 220 may be implemented in a standalone or distributed configuration, such as in a parallel processor configuration. Memory 230 may include a random access memory (RAM) or another type of dynamic storage device that may store information and instructions for execution by processor 220. Memory 230 may also be used to store temporary variables or other intermediate information during execution of instructions by processor 220.

ROM 240 may include a ROM device and/or another type static storage device that may store static information and instructions for processor 220. Storage device 250 may include a magnetic disk and/or some other type of magnetic or optical recording medium and its corresponding drive for storing information and instructions.

Input device 260 may include one or more interfaces, components, or mechanisms that permit a user to input information to network device 130. Input device 260 may include a keyboard, a mouse, a pen, voice recognition and/or biometric mechanisms, etc. Output device 270 may include one or more mechanisms that output information to, for example, a user. Output device 270 may include a display, a printer, one or more speakers, etc. Communication interface 280 may include any transceiver-like mechanism that enables network device 130 to communicate with other devices and/or systems. For example, communication interface 280 may include a modem, an Ethernet interface to a LAN, a wireless transceiver for coupling a wireless client 110 to network 120, an interface associated with policy server 150, an input/output interface associated with network device 130, etc.

Network device 130, consistent with implementations of the invention, may perform certain processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices, carrier waves, or data structures. Execution of the sequences of instructions contained in memory 230 may cause processor 220 to perform certain acts that will be described later. In alternative implementations, hardwired circuitry may be used in place of, or in combination with, software instructions to implement functions performed by network device 130. Thus, implementations consistent with the principles of the invention are not limited to any specific combination of hardware circuitry and software.

Exemplary Data Unit Exchange

Figure 3:
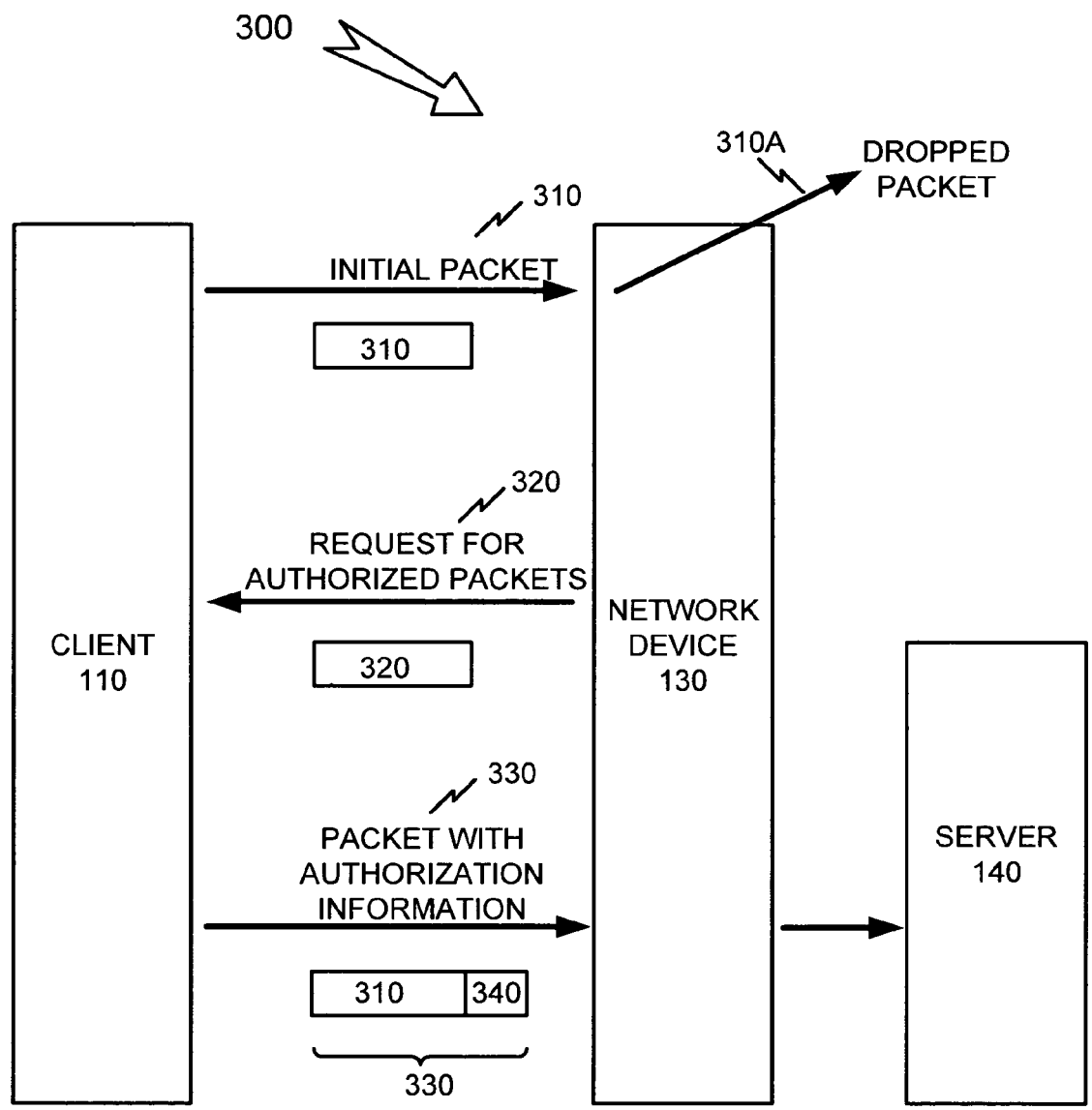
FIG. 3 illustrates an exemplary implementation illustrating an exchange of data units that may be used in conjunction with the network illustrated in FIG. 1 according to an implementation consistent with the principles of the invention.

FIG. 3 illustrates an exemplary implementation illustrating an exchange of data units that may be used in conjunction with the network illustrated in FIG. 1 according to an implementation consistent with the principles of the invention. Exchange 300 may occur between client 110 and network device 130. Exchange 300 may include an initial packet 310, a request for authorized packets 320 (hereinafter, request 320), and a packet with authorization information 330 (hereinafter, subsequent packet 330). "Packet" is used in connection with FIG. 3 and FIG. 4 below and is representative of a type of data unit that may be used with implementations of the invention. Implementations, such as those described in connection with FIGS. 3 and 4 may also operate with other types of data units consistent with the principles of the invention.

Client 110 may desire to communicate with server 140 via network 120. Client 110 may send initial packet 310 to server 140. Network device 130 may intercept initial packet 310 on behalf of server 140. For example, network device 130 may operate as an edge device between a public network and a private network on which server 140 operates. Network device 130 may attempt to determine if initial packet 310 is from an authorized source.

"Authorized," as used herein, refers to a device, data unit, or communication protocol that has been identified, authenticated, or determined to meet a criteria administered by policy server 150. For example, an authorized source may include a source whose identity can be ascertained and/or whose compliance with one or more criteria can be ascertained. In one implementation, an authorized source may be a source that is running an approved version of antivirus software and/or that has a source identity that is registered with network device 130 and/or policy server 150. The source identity may be associated with a device, such as client 110, and/or may be associated with a user, such as an operator, of a device. An "authorized data unit" may refer to a data unit associated with an authorized source. An authorized data unit may include authorization information, such as a token, that can be operated on by a receiving device to determine if the source and/or data unit are legitimately authorized. Authorized devices, data units, and/or protocols may be allowed to operate in a determined way on network 120, whereas unauthorized devices, data units, and/or protocols may not be allowed to operate in the determined way.

Network device 130 may be configured to process initial packet 310 to determine if the packet and/or client 110 has been authorized. If network device 130 determines that initial packet 310 and/or client 110 is not authorized, network device 130 may drop initial packet 310 (shown as dropped packet 310A in FIG. 3). Dropped packet 310A may not be made available to any other devices operating on a network, including server 140.

Network device 130 may send a data unit to client 110 if initial packet 310 is not authorized. The data unit sent by network device 130 may be any type of data unit that is capable of informing client 110 that an authorized data unit is requested by network device 130. For example, network device 130 may send request 320 to client 110. In one implementation, request 320 may be an Internet control message protocol (ICMP) packet 320. In other implementations, request 320 may include other types of data units without departing from the spirit of the invention. Implementations of request 320, such as an ICMP packet, may include a protocol that can be used for reporting errors associated with a networking protocol, such as IP. Implementations consistent with the principles of the invention may employ any type of message that can be used to provide feedback regarding message delivery, reliability, and/or processing issues associated with a networking protocol. For example, an ICMP packet-based implementation of request 320 may include an authorization request in a portion of the packet, such as a header portion.

Client 110 may receive request 320 and may process request 320 to determine that network device 130 is requesting an authorization mechanism, such as an authorized data unit that includes authorization information. Client 110 may have authorization information stored thereon and/or may obtain an authorization information from another device, such as policy server 150. For example, policy server 150 may determine the compliance of client 110 prior to when client 110 attempts to communicate with server 140. In response to the request for an authorized data unit (request 320), client 110 may include authorization information in subsequent packet 330 and/or may append an authorization mechanism/information to a packet, such as subsequent packet 330. For example, client 110 may send subsequent packet 330 to network device 130 in response to the request for authorization information (request 320). Subsequent packet 330 may include any data unit that is modified to include authorization information. Authorized packets, such as subsequent packets 330, may be valid packets from the standpoint of a destination device with respect to a network protocol used by the destination device. For example, subsequent packet 330 may appear to be a valid IP packet to server 140. The authorization information may identify an endpoint, or source device, associated with subsequent packet 330. In one implementation, subsequent packet 330 may include a copy of initial packet 310 and token 340, as illustrated in FIG. 3, where token 340 is a data unit that operates as an authorization mechanism.

Token 340 may include a data unit, or portion thereof, that contains information about an identity, an authorization and/or a status of client 110. Token 340 may also include information about a destination device, destination directories, and/or destination files that client 110 can access during an authorized communication session. Network device 130 may process the token to determine if subsequent packet 330 includes required authorization information. For example, network device 130 may extract the contents of token 340 and may compare them with stored content on network device 130 and/or policy server 150. Stored content may be, for example, a copy of the contents of token 340. If network device 130 determines that the token contents match the token copy, network device 130 may determine that token 340 is valid and that client 110 is authorized.

Network device 130 may allow subsequent packet 330 to pass to server 140 if subsequent packet 330 includes required authorization information. If client 110 is determined to be authorized, network device 130 may pass the entire contents of subsequent packet 330 and/or may pass only a portion of subsequent packet 330 to server 140. For example, subsequent packet 330 may be an IPsec packet, and network device 130 may extract the inner encapsulated packet and pass the extracted inner packet to server 140. Client 110 may access portions of server 140 for which client 110 is authorized when network device 130 makes subsequent packet 330 available to server 140.

Exemplary Method for Authorized Communication

Figure 4:
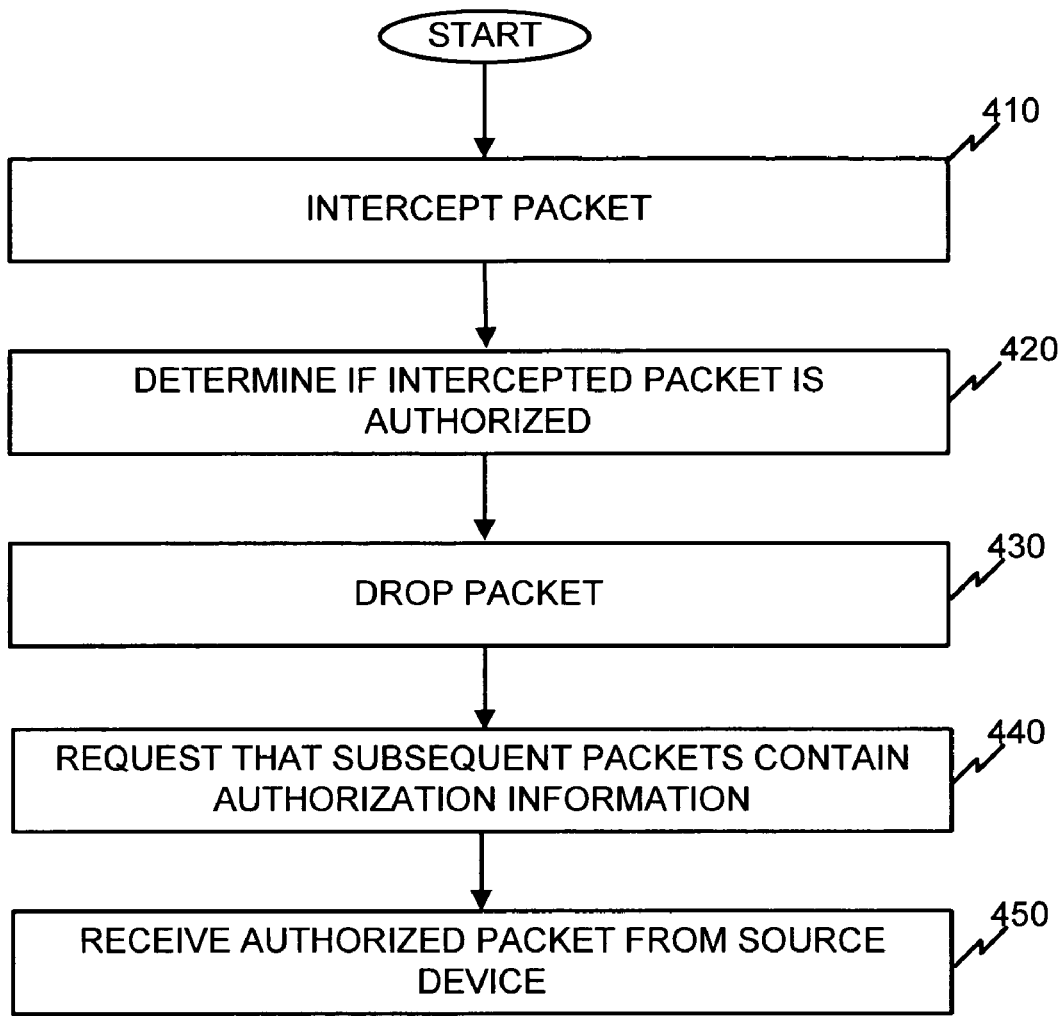
FIG. 4 illustrates an exemplary method for communicating in accordance with a network policy according to the exemplary implementations of FIGS. 1 and 3 consistent with the principles of the invention.

FIG. 4 illustrates an exemplary method for communicating in accordance with a network policy according to the exemplary implementations of FIGS. 1 and 3. The method of FIG. 4 is exemplary and other acts may be included and/or acts removed without departing from the spirit of the invention.

Client 110 may send an initial packet 310 to server 140. Network device 130 may intercept initial packet 310 (act 410). For example, network device 130 may be operating as an edge router that protects a LAN on which server 140 operates. Network device 130 may be configured to intercept all traffic destined for devices operating on the LAN.

Network device 130 may process initial packet 310 to determine if the packet is associated with an authorized source (act 420). For example, an authorized packet may indicate that a source device associated with the packet is authorized to participate in a communication session with a destination. In one implementation, an authorized source may be client 110 and/or an operator of client 110. If network device 130 determines that the packet is associated with an authorized device, the authorized device may be allowed to send authorized packets to server 140. In contrast, if network device 130 determines that client 110 is not authorized based on an examination of initial packet 310 (act 420), network device 130 may drop initial packet 310 (act 430). A dropped packet may not be passed on to any other devices operating on network 120 and/or another network.

Network device 130 may send a message to client 110 requesting that subsequent packets sent to server 140 contain authorization information. For example, network device 130 may send request 320 to client 110 to request that one or more authorized packets be sent to network device 130 (act 440). Subsequent packet 330 may operate as the authorized packet. Network device 130 may receive the authorized packet from the source device, such as client 110 (act 450). Subsequent packet 330 may include authorization information that can be used by the receiving device, such as network device 130, to determine if subsequent packet 330 was received from an authorized device that complies with one or more network policies.

In one implementation, client 110 may receive request 320 and may retrieve authorization information from a storage device, such as storage device 250, to generate subsequent packet 330. Alternatively, client 110 may need to obtain authorization information from policy server 150. For example, client 110 may need to receive a token from policy server 150. The token may be required by network device 130 to authorize client 110. Policy server 150 may perform actions with respect to client 110 before providing client 110 with the token. For example, policy server 150 may require that client 110 establish its identity with policy server 150. Client 110 may establish its identity by providing identification information, such as a user name, password, and/or responses to questions/prompts provided by policy server 150. The identification of client 110 may include identifying/authenticating a user associated with client 110.

Client 110 may also have its characteristics, or health, examined by policy server 150 prior to obtaining an authorization mechanism, such as the token. For example, policy server 150 may evaluate the versions of software operating on client 110, may determine if antivirus definitions are up to date on client 110, and may determine a hardware/software configuration of client 110 prior to providing a token to client 110. Client 110 may only receive a token from policy server 150 if its identity and/or compliance/health are determined to be acceptable to policy server 150. In certain implementations, client 110 may have established its identity and/or characteristics with policy server 150 prior to receiving request 320. In these implementations, client 110 may respond to request 320 by providing authorization information in subsequent packets 330 sent to server 140.

In certain implementations, policy server 150 may provide client 110 with other types of information that can be used to establish authorized communication sessions between client 110 and network device 130. For example, policy server 150 may provide client 110 with parameters that can be used to establish a tunnel with network device 130. A tunnel may be formed by encapsulating a data unit, such as packet 310, within another data unit referred to as a wrapper. The wrapper may be removed by a device, such as network device 130, when a wrapped packet is received. The receiving device may operate on the data unit contained within the wrapper once the wrapper is removed.

In one implementation, client 110 and network device 130 may communicate via an IPsec tunnel by wrapping a data packet, such as packet 310, within a tamper resistant wrapper. The IPsec tunnel may allow client 110 and network device 130 and/or server 140 to communicate via a secure channel. Policy server 150 may provide network device 130 with IPsec parameters that correspond to IPsec parameters provided to client 110 so that network device 130 and client 110 can establish the IPsec tunnel.

Subsequent packet 330 may include authorization information, such as token 340, and/or a message. Portions of subsequent packet 330 may include a header portion and a payload portion. For example, a header portion may include destination and/or source addresses and the payload portion may include application data that can be operated on by a destination device, such as network device 130 and/or server 140.

Network device 130 may operate on token 340 to determine if client 110 is authorized to communicate with server 140. For example, network device 130 may extract the contents of token 340 and may compare the extracted contents to stored content on network device 130 and/or policy server 150 to determine if token 340 is valid. Assume that network device 130 receives token 340 via subsequent packet 330. Network device 130 may process token 340 and may extract information contained therein. Network device 130 may compare the extracted information to information associated with a token copy stored on network device 130. If the information extracted from the token matches the information in the token copy, token 340 may be determined to be valid. In one implementation, network device 130 may receive the stored content (e.g., a token copy) from policy server 150 prior to the arrival of subsequent packet 330, contemporaneously with the arrival of subsequent packet 330 and/or after receiving subsequent packet 330 from client 110. In one implementation, network device 130 may compare the contents of token 340 with a token copy stored on policy server 150.

In an implementation, token 340 may contain a reference to stored information that can be used to determine if a source device and/or a subsequent packet 330 are authorized. For example, token 340 may include a pointer to a memory location on network device 130 and/or policy server 150 that contains authorization information that can be used to determine if a source device and/or subsequent packet 330 are authorized with respect to a communication session involving a destination device, such as server 140.

Client 110 may send a number of subsequent packets 330 in response to request 320. Network device 130 may allow subsequent packets 330 to pass through to server 140. For example, substantially all of the packets associated with an authorized communication session between client 110 and server 140 may be subsequent packets 330. Subsequent packets 330 may include tokens 340 so that network device 130 can determine that all packets associated with an authorized communication session are authorized packets. Network device 130 may remove authorization information from subsequent packets 330 so that server 140 receives data units that do not include authorization information.

In an implementation, network device 130 may notify policy server 150 when initial packet 310 is received. Network device 130 may inform policy server 150 that authorization information is needed from client 110 before client 110 is allowed to communicate with server 140. Policy server 150 may have a connection to client 110 so that policy server 150 can inform client 110 that initial packet 310 has been dropped and that network device 130 requires authorized packets in order for client 110 to communicate with server 140.

In one implementation, network device 130 may verify that client 110 is allowed to communicate with a destination, such as server 140. For example, network device 130 may operate as an edge device for multiple servers operating on a corporate LAN. Assume that client 110 attempts to communicate with an email server. Network device 130 may determine whether client 110 can access the email server. Network device 130 may perform operations to determine if client 110 is allowed to access the email server. If network device 130 determines that client 110 is not allowed to access the email server, network device 130 may drop subsequent packet 330 and/or may notify client 110 that it is not allowed to access the email server. In contrast, if network device 130 determines that client 110 is allowed to access the email server, network device 130 may make the authorized packet available to server 140. Server 140 may allow access thereto by client 110 when the packet is passed from network device 130 to server 140.

Network device 130 operating in cooperation with policy server 150 may implement substantially any type and/or number of network policies for substantially any number of destination devices. For example, policy server 150 may provide network device 130 with authorization information that allows client 110 to have read and write privileges to certain directories/files on a first server, read only privileges to directories/files on a second server, and no access privileges to directories/files on a third server.

Implementations of policy server 150 may facilitate enforcement of network policies by network device 130 without requiring that network device 130 know the topology of the network from which data units are received. For example, implementations consistent with the principles of the invention may allow network device 130 to handle data units having translated source addresses since network device 130 uses authorization information, such as a token or IPsec encapsulation, to authorize a source device rather than using a source address associated with incoming data units received on behalf of server 140.

CONCLUSION

Systems and methods consistent with the principles of the invention provide mechanisms for enforcing network policies on a client-by-client basis without requiring that a policy server and/or network device know the topology of the network on which a client is operating. Furthermore, policy enforcement can occur on virtually any network running virtually any protocol.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIG. 4 the order of the acts may be varied in other implementations consistent with the present invention. Moreover, non-dependent acts may be implemented in parallel.

Also, network and system implementations have been illustrated and described using a single network device, policy server, destination device, client device and network. However, in other implementations, networks and systems may include multiple devices and may further include additional devices, such as routers, intrusion detection systems (IDSs), service gateways, proxy servers, and the like. In addition, devices, such as firewalls, may employ multiple interfaces or ports for receiving and sending data units.

While exemplary implementations have been described herein, the processing performed by one of the devices described above may be performed by another device. For example, the processing performed by network device 130 and policy server 150 may be performed by a single device in alternative implementations. Therefore, implementations consistent with the principles of the invention are not necessarily limited to a particular configuration.

Moreover, it has been described that a client device, or source device, initiates communication by sending, for example, an initial packet. However, another device, such as a remote device, may initiate communication sessions on behalf of a client. In addition, a destination device may initiate communication sessions on behalf of a client. For example, client 110, network device 130, server 140 and policy server 150 may all send and/or receive data units, such as packets, in accordance with the principles of the invention. In addition, devices other than client 110 may send authorized data units in order to carry out authorized communication sessions with a destination device. For example, in one alternative implementation consistent with the principles of the invention, server 140 may send authorized packets to client 110.

Furthermore, exemplary networks, systems, and methods have been described for performing identification of a source device using a policy server, requesting authorized packets via exemplary data units, such as ICMP packets, in conjunction with a network device, and for establishing IPsec tunnels. In other implementations, alternative configurations and message types may be used. For example, a request for an authorized packet may flow from network device 130 through policy server 150 and then to client 110. Policy server 150 may provide client 110 with a token, or other authorization mechanism, and client 110 may provide the token to network device 130. Network device 130 may process the token and may allow client 110 to communicate with a destination device, such as server 140, in accordance with the principles of the invention.

Moreover, it will be apparent to one of ordinary skill in the art that aspects of the invention, as described above, may be implemented in many different forms of software, firmware, and hardware in the implementations illustrated in the figures. The actual software code, or specialized control hardware, used to implement aspects consistent with the principles of the invention is not limiting of the present invention. Thus, the operation and behavior of the aspects were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The scope of the invention is defined by the claims and their equivalents.

What is claimed is:

1. A system comprising:
a network device to allow authorized communication between a destination device and a source device, the network device to:
receive a first packet sent from the source device to the destination device;
determine that the first packet does not include authorization information;
provide a message to a policy server that establishes a network policy, the message informing the policy server that authorization information should be included in subsequent packets from the source device to the destination device;

receive, from the policy server, a copy of authorization information associated with the source device;

receive, from the source device, a second packet intended for the destination device;

determine that the second packet includes authorization information;

compare the authorization information included in the second packet with the copy of authorization information received from the policy server; and forward at least a portion of the second packet to the destination device when the authorization information, included in the second packet, matches the copy of authorization information received from the policy server.

2. The system of claim 1, where the network device is further to:

receive additional authorization information from the policy server, where the additional authorization information is used to establish a communication channel between the source device and the network device, where the communication channel transports encapsulated packets.

3. The system of claim 2, where the network device extracts a packet from one of the encapsulated packets and makes the extracted packet available to the destination device.

4. The system of claim 1, where the network device makes at least a portion of the authorization information, included in the second packet, available to the policy server to determine if the authorization information is legitimate.

5. The system of claim 1, where the authorization information, included in the second packet, comprises a token.

6. The system of claim 5, where the token comprises information associated with at least one of an identity of the source device, an identity of a user associated with the source device, a health of the source device, a set of access rules for the source device, or a protocol to use for the authorized communication.

7. The system of claim 6, where the health of the source device comprises information about a version of software operating on the source device.

8. The system of claim 5, where the token includes a reference to information that authorizes the source device.

9. The system of claim 1, where the authorization information comprises an Internet Protocol (IP) packet that can be operated on by the destination device or another device on the network.

10. A method, performed by a network device, for establishing authorized communication between a source device and a destination device, the method comprising:

receiving a first packet from the source device, the first packet being intended for the destination device;

determining that the first packet does not include authorization information;

providing, to a policy server, a message in response to determining that the first packet does not include authorization information, the message informing the policy server that authorization information should be included in subsequent communication from the source device;

intercepting a second packet from the source device, the second packet being intended for the destination device;

determining that the second packet includes authorization information;

receiving a copy of authorization information from the policy server;

processing the authorization information, in response to determining that the second packet includes authorization information, to determine whether the authorization information, included in the received second packet, matches the received copy of the authorization information; and forwarding the second packet to the destination device when the authorization information included in the received second packet matches the received copy of the authorization information.

11. The method of claim 10, where processing the authorization information comprises:

comparing a first token, included in the authorization information included in the second packet, with a second token included in the received copy of authorization information.

12. The method of claim 10, where the forwarding comprises:

providing the second packet to the destination device without the authorization information.

13. The method of claim 10, where the processing further comprises:

using the authorization information to establish an Internet Protocol secure (IPsec) tunnel with the source device.

14. A network device, comprising:

a processor; and a memory to store one or more instructions which when executed by the processor, cause the processor to:

receive a first packet from a source device, the first packet being intended for a destination device;

determine that the first packet does not include authorization information;

receive a copy of authorization information from a policy server, where the copy of authorization information is used to determine if communication between the source device and the destination device can be authorized;

send, to the policy server, a request that subsequent packets from the source device, intended for the destination device, contain authorization information;

receive, from the source device, subsequent packets;

determine that the subsequent packets include authorization information;

compare the authorization information included in the subsequent packets with the received copy of the authorization information; and allow at least a portion of the subsequent packets to reach the destination device when the authorization information, included in the subsequent packets, matches the copy of the authorization information received from the policy server.

* * * * *